Sept. 7, 1926.
D. J. ANGUS
1,599,268
METER
Filed May 29, 1924
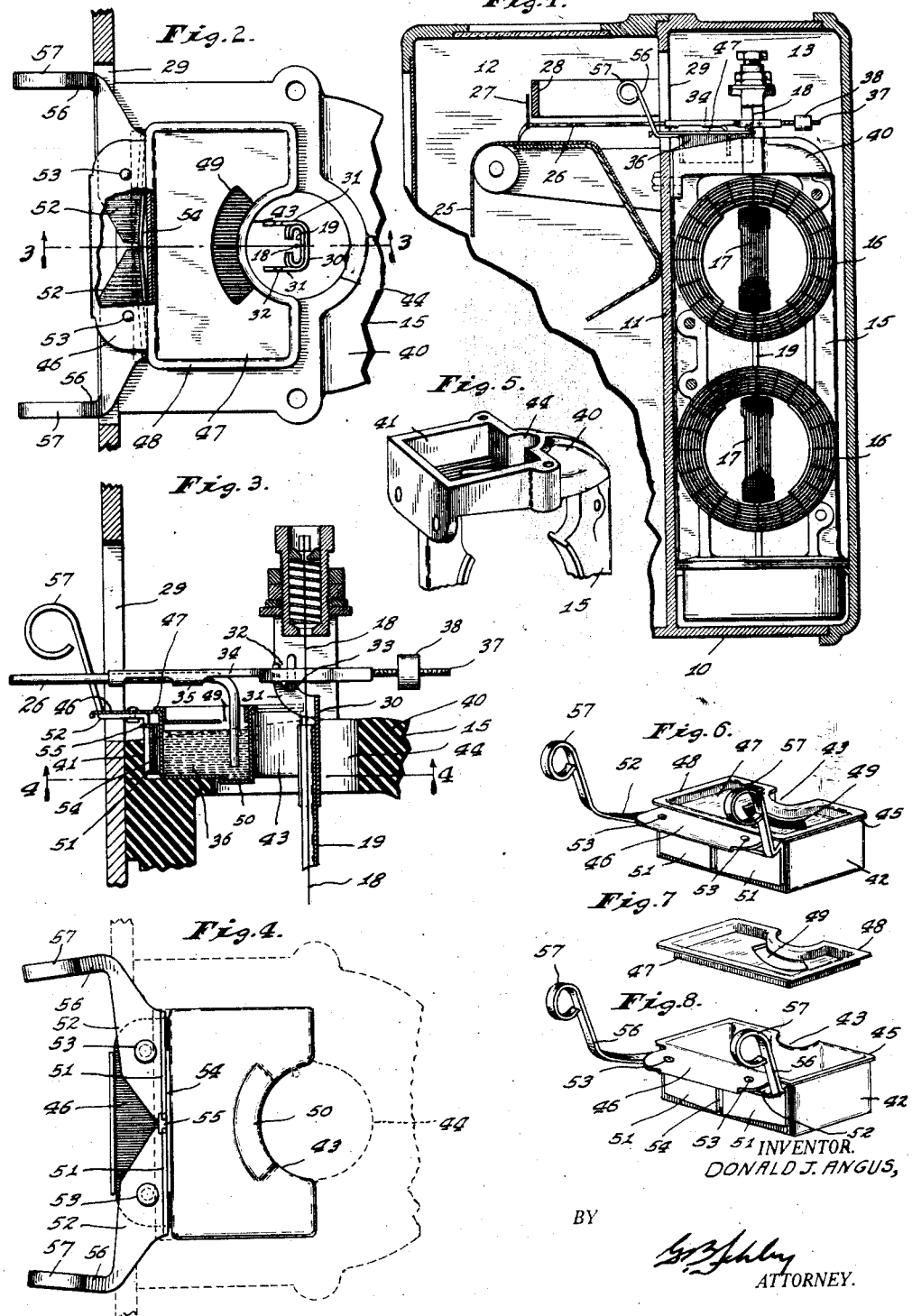
INVENTOR.
DONALD J. ANGUS,
BY
ATTORNEY.

Patented Sept. 7, 1926.

1,599,268

UNITED STATES PATENT OFFICE.

DONALD J. ANGUS, OF INDIANAPOLIS, INDIANA.

METER.

Application filed May 29, 1924. Serial No. 716,590.

It is the object of my invention to improve the construction of graphic meters, and particularly of the inking mechanism thereof. More specifically, it is the object of my invention to produce a meter having a separable inkwell, which may be removed readily, and without tools, without disturbing the meter proper; and to provide in combination with such removable inkwell a removable pen carried by the movable element of the meter and also removable without tools.

The accompanying drawing illustrates my invention, in connection with an electric meter: Fig. 1 is a fragmental vertical section through an electric meter embodying my invention; Fig. 2 is a plan of the removable inkwell, in place in its support; Fig. 3 is a vertical section on the line 3—3 of Fig. 2; Fig. 4 is a horizontal section, looking upward, on the line 4—4 of Fig. 3, with the inkwell-holding leaves released; Fig. 5 is a fragmental perspective view of the upper end of the frame, with the recess for the inkwell; Fig. 6 is a perspective view of the inkwell, removed; and Figs. 7 and 8 are perspective views of the inkwell-top and of the inkwell-body, respectively.

The meter is shown as mounted in a casing 10 having a vertical partition 11 which divides the meter into an openable front compartment 12 containing the record-making parts and an openable rear compartment 13 containing the metering parts, as set forth in my Patent No. 1,370,179, granted March 1, 1921; but that is merely a convenient mounting, and my invention is not limited thereto.

The metering or operating parts shown in the rear compartment comprise a frame 15, conveniently of molded insulation, carrying one or more fixed field coils 16; which field coils react with movable coils 17 carried on a torsion wire 18, preferably being directly mounted on a flattened tubular staff 19 which in turn is carried by the torsion wire 18 extending through it. The ends of the torsion wire 18 are suitably supported from the frame 15. The mounting of the movable element of the meter conveniently follows the disclosure in my aforesaid prior patent.

The record-making parts shown in the front compartment comprises a movable record sheet 25, movable in any convenient way, to travel beneath the marking end of the pen 26; which also conveniently carries a pointer 27 movable in front of an arcuate scale 28. The pen 26 is carried by the movable element of the meter, in the rear compartment 13; but projects through an opening 29 in the partition 11 into the front compartment 12, for co-operation there with the chart 25 and the scale 28. This construction also conveniently follows the disclosure of my aforesaid prior Patent No. 1,370,179, and of my prior Patent No. 1,425,229, granted August 8, 1922.

The pen 26 is removably supported on the movable element of the meter, as set forth in my aforesaid prior patents. This removable mounting of the pen, per se, is covered by my prior patents; but it also forms an element of some of the combinations claimed in the present application, so that it will be briefly described here. A sheet-metal clip 30 is mounted on the upper end of the supporting staff 19, for carrying the pen 26. This clip 30 has a pair of upwardly extending arms 31, in which there are vertical slots 32 in a plane displaced forward from the torsion wire 18. The slots 32 receive the knife-blade 33 on which is mounted a pen-carrier 34. The pen-carrier has the pen 26 attached to its forward end, by a pair of fingers 35 surrounding the tubular body of the pen. The pen proper consists of this tubular body, with its forward end turning down to cooperate with the chart 25, and with its rear end turning down to dip into ink in the inkwell 36, which will be described later. The pen-carrier 34 also projects backward from the knife-blade 33, past the torsion wire 18; and at its rear end is provided with a screw 37 carrying a nut 38 which serves as an adjustable counterweight to control the force with which the forward or marking end of the pen bears against the record sheet. The pen-unit—comprising the pen 26 proper, the pointer 27 mounted thereon, the pen-carrier 34, and its supporting knife-blade 33—may readily be removed, without tools, by merely lifting the knife-blade 33 from the slots 32. By such removability, it is made much easier to clean the pen, and much safer to do so without liability of injuring other elements of the meter. This removal may be made from the front compartment 12, without opening the rear compartment 13.

The inkwell 36 is also removable as a unit, through the opening 29 in the partition 11, after first removing the pen-unit.

To this end, the upper cross-bar 40 of the frame 15 is provided with an upwardly opening pocket 41, the rear wall of which pocket is conveniently substantially in the vertical transverse plane of the torsion wire 18. The pocket 41 is conveniently of generally rectangular shape, and receives a removable inkwell 36, which is generally of the same contour as the pocket 41. The rear wall of the inkwell and the rear wall of the pocket 41, however, have mating semi-cylindrical recesses 43 and 44 respectively, to provide a vertical cylindrical opening for the torsion wire 18, the clip 30, and the upper end of the staff 19. The body of the inkwell 36 is conveniently made of a one-piece stamping of sheet-metal, of the form shown best in Fig. 8, conveniently with a narrow out-turned flange 45 at the rear and side edges and a wide out-turned flange 46 at the front edge. The open top of this inkwell-body receives a cover 47, also conveniently made as a one-piece stamping, with an offset edge-flange 48 arranged to overlap the flanges 45 and 46 slightly while the offsetting of such edge-flange permits the central part of the cover to fit into the open upper end of the inkwell-body 36, as is clear from Figs. 3 and 6. The cover 47 may readily be removed from or put into the open top of the inkwell-body 36. The cover 47 is provided with an arcuate slot 49 for receiving the down-turned rear end of the pen 26; and the bottom of the inkwell-body may be provided with a similar arcuate depression 50 directly below the slot 49, to make sure of sufficient clearance for the down-turned rear end of the pen 26 and to provide drainage from the rest of the inkwell to a point below such pen-end when the ink-supply gets low.

The inkwell 36 is held in place in the pocket 41 by frictional holding members. These consist of a pair of holding leaves 51 lying in front of the front wall of the inkwell 36, and below the flange 46; which holding leaves at their upper edges are provided with forwardly turned flanges 52 pivoted to the flange 46 by pivots 53 near the lateral ends of such flange. Between the holding leaves 51 and the front wall of the inkwell 36 is a leaf-spring 54, bent at the middle so that it tends to press the adjacent ends of the leaves 51 away from the inkwell wall, as is indicated in Figs. 2 and 8. The leaf-spring is suitably held in position by having an out-turned finger 55 at the middle of its upper edge, which finger is received in slots in the adjacent vertical edges of the leaves 51. The outer ends of the flanges 52 of the leaves 51 are provided with forwardly and upwardly projecting fingers 56, having loops 57 at their free ends to receive the thumb and forefinger of the hand of the operator. The inkwell proper is behind the partition 11; but the arms 56 project through the opening 29 in such partition, and the loops 57 are in front of such partition; so that the operator may grasp the loops 57 between his thumb and forefinger, press them together to force the adjacent ends of the leaves 51 toward the inkwell against the action of the spring 54, and thus either put the inkwell in place in the pocket 41 or remove it from such pocket. This may be done without opening the rear compartment 13.

By this removability of the inkwell 36, and of the pen 26, it becomes possible to clean these parts, and to re-fill the inkwell, without disturbing the meter elements proper, and without opening the compartment 13 containing such meter elements; and to eliminate substantially entirely the danger of spilling ink within the meter, as the filling can be done with the inkwell removed completely from the remainder of the meter. Further, it makes it possible to empty the inkwell and pen, without disturbing the rest of the meter. This not only facilitates filling of the inkwell, and makes for keeping the meter element free from ink, but also makes it possible more easily to prepare the meter both for shipment and for use without danger of disturbing its adjustment.

I claim as my invention:—

1. In a recording meter, the combination of a frame, a variably movable metering device associated with said frame, a pen meteringly movable by said metering device, a chart with which the pen co-operates to make a graphic meter record, said frame being provided with a pocket, and an inkwell removably mounted in said pocket and associated with said pen, said inkwell being provided with a manually releasable spring-pressed member for holding it in said pocket.

2. In a recording meter, the combination of a frame, a variably movable metering device associated with said frame, a pen meteringly movable by said metering device, a chart with which the pen co-operates to make a graphic meter record, said frame being provided with a pocket, and an inkwell removably mounted in said pocket and associated with said pen, said inkwell being provided with lifting fingers for enabling an operator to lift the inkwell, and being also provided with a device which co-operates with the wall of the pocket to hold the inkwell in place therein and which is releasable from the pocket-wall upon the grasping of said fingers.

3. In a recording meter, the combination of a casing having a partition dividing it into a metering compartment and a recording compartment, a variably movable metering device in the metering compartment, a moving chart in the recording compartment, said partition having an opening through it, a pen associated with and meteringly movable by the metering device in the metering compartment and projecting through said partition-opening into co-operation with the record sheet in the recording compartment, and an inkwell removably associated with said metering device and removable through said partition-opening.

In witness whereof, I have hereunto set my hand at Indianapolis, Indiana, this 27th day of May, A. D. one thousand nine hundred and twenty-four.

DONALD J. ANGUS.